(12) United States Patent
Rasool et al.

(10) Patent No.: US 10,313,736 B2
(45) Date of Patent: *Jun. 4, 2019

(54) VIDEO ELECTRONIC PROGRAMMING GUIDE

(71) Applicant: SLING MEDIA PVT LTD., Bangalore (IN)

(72) Inventors: Mohammed Rasool, Bangalore (IN); Yatish Raikar, Bangalore (IN)

(73) Assignee: SLING MEDIA PVT LTD, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,477

(22) Filed: Jan. 13, 2017

(65) Prior Publication Data

US 2017/0188089 A1 Jun. 29, 2017

Related U.S. Application Data

(63) Continuation of application No. 14/810,108, filed on Jul. 27, 2015, now Pat. No. 9,571,881.

(51) Int. Cl.
| | |
|---|---|
| *H04N 21/431* | (2011.01) |
| *H04N 21/258* | (2011.01) |
| *H04N 21/482* | (2011.01) |
| *H04N 21/422* | (2011.01) |
| *H04N 21/84* | (2011.01) |
| *H04N 21/43* | (2011.01) |

(Continued)

(52) U.S. Cl.
CPC ......... *H04N 21/4312* (2013.01); *G11B 27/34* (2013.01); *H04N 21/25891* (2013.01); *H04N 21/42204* (2013.01); *H04N 21/4307* (2013.01); *H04N 21/4821* (2013.01); *H04N 21/84* (2013.01); *H04N 21/8583* (2013.01)

(58) Field of Classification Search
CPC ............ H04N 21/431; H04N 21/4312; H04N 21/4307; H04N 21/4302; H04N 21/25891; H04N 21/42204; H04N 21/4821; H04N 21/84; H04N 21/8583; G11B 27/34

See application file for complete search history.

(56) References Cited

U.S. PATENT DOCUMENTS

| | | |
|---|---|---|
| 5,815,145 A | 9/1998 | Matthews, III |
| 6,405,371 B1 | 6/2002 | Oosterhout et al. |
| 7,979,879 B2 | 7/2011 | Kazama et al. |

(Continued)

*Primary Examiner* — James R Sheleheda
(74) *Attorney, Agent, or Firm* — Kilpatrick Townsend & Stockton LLP

(57) ABSTRACT

Systems and methods for providing a video electronic programming guide ("video EPG") may include outputting a primary program for display on a display screen, receiving a command to activate the video EPG, and in response to receiving the command, outputting a plurality of widgets for display on a display screen. Each of the plurality of widgets may represent a category of broadcast programs. Systems and methods may include receiving a widget selection for one of the plurality of widgets and outputting a video menu corresponding to the selected widget for display on the display screen. The video menu includes a plurality of video scenes, whereby each of the plurality of video scenes represents a broadcast program categorized in the selected widget. Systems and methods may include receiving a program selection for one of the plurality of video scenes.

10 Claims, 6 Drawing Sheets

(51) Int. Cl.
*G11B 27/34* (2006.01)
*H04N 21/858* (2011.01)

(56) References Cited

U.S. PATENT DOCUMENTS

| | | | |
|---|---|---|---|
| 8,381,245 B2 | 2/2013 | Stallings et al. | |
| 8,578,416 B1 | 11/2013 | Radloff et al. | |
| 9,271,030 B2 | 2/2016 | Stallings et al. | |
| 9,304,592 B2 | 4/2016 | Friedman | |
| 9,326,035 B1 | 4/2016 | Thompson et al. | |
| 9,571,881 B1* | 2/2017 | Rasool | G11B 27/34 |
| 2005/0104980 A1 | 5/2005 | Kim et al. | |
| 2005/0160458 A1* | 7/2005 | Baumgartner | H04H 60/46 |
| | | | 725/46 |
| 2008/0127253 A1 | 5/2008 | Zhang et al. | |
| 2009/0079872 A1 | 3/2009 | Seong et al. | |
| 2009/0249393 A1 | 10/2009 | Shelton et al. | |
| 2011/0072463 A1 | 3/2011 | Zaslavsky et al. | |
| 2011/0214145 A1 | 9/2011 | Nashida et al. | |
| 2011/0271304 A1 | 11/2011 | Loretan et al. | |
| 2012/0072952 A1 | 3/2012 | Vaysman et al. | |
| 2012/0154437 A1* | 6/2012 | Gonzalez | H04N 5/44543 |
| | | | 345/629 |
| 2014/0033252 A1 | 1/2014 | Radloff et al. | |
| 2014/0208356 A1 | 7/2014 | McCarthy et al. | |
| 2014/0269930 A1* | 9/2014 | Robinson | H04N 21/2365 |
| | | | 375/240.24 |
| 2016/0073166 A1* | 3/2016 | Hu | G06F 16/48 |
| | | | 725/20 |
| 2016/0127791 A1* | 5/2016 | Roberts | H04N 21/4312 |
| | | | 725/43 |
| 2017/0034569 A1 | 2/2017 | Rasool et al. | |

* cited by examiner

VIDEO ELECTRONIC PROGRAMMING GUIDE

CROSS-REFERENCE TO RELATED APPLICATION

This Application is a continuation of U.S. application Ser. No. 14/810,108, entitled "VIDEO ELECTRONIC PROGRAMMING GUIDE," filed Jul. 27, 2015, the entire disclosure of which is incorporated herein by reference for all purposes.

BACKGROUND OF THE INVENTION

Television viewers watching a live or recorded program on a display device may be aware that there are other programs of interest being broadcast at the same moment. The television viewers may wish to view the other programs, for instance for an update on events in the other programs. In that case, the television viewer may press a media guide button on a remote control to activate an electronic programming guide ("EPG") window, which is then output on the primary screen to allow the viewer to browse up or down through the EPG and select the other programs of interest. Typically, the EPG is a large grid of text including broadcast programming titles and their scheduled times. In one example, if a television viewer watching a football game on the primary screen wishes to view three other football games that are also being broadcast at that time, the television viewer must open up and scroll through the EPG to locate the broadcast channels of the other games and observe the other games individually. In some cases, the television viewer must bring up each channel of the three other football games on the primary screen in order to observe the contents of those channels, which may replace the football game that was originally displayed on the primary screen. In that case, events in the original football game may potentially be missed. In another example, the EPG may take up the entire television screen and obstruct or prohibit viewing of the original football game. In still another example, the television viewer may discover, after having opened the EPG and turned to the other channels, that a commercial break is being broadcast instead of the other football game contents. As such, current approaches are cumbersome, time-consuming, and may lead to discouraging viewer experiences. There is a need for improved systems and methods for EPGs. This application is intended to address such issues and provide related advantages.

BRIEF SUMMARY OF THE INVENTION

In general, the systems and methods disclosed herein are directed to electronic programming guides, and more particularly, to electronic programming guides for satellite broadcast television.

In one aspect, a method for providing a video electronic programming guide ("video EPG") is shown. The method may include outputting, by a television receiver, a primary program for display on a display screen and/or receiving, by the television receiver, a command to activate the video electronic programming guide. The method may include, in response to receiving the command, outputting, by the television receiver, a plurality of widgets for display on a display screen, whereby each of the plurality of widgets may represent a category of broadcast programs. The method may include receiving, by the television receiver, a widget selection for one of the plurality of widgets on the display screen. Further, the method may include, in response to receiving the selection, outputting, by the television receiver, a video menu corresponding to the selected widget for display on the display screen. The video menu may include a plurality of video scenes, whereby each of the plurality of video scenes represents a broadcast program categorized in the selected widget. The method may include receiving, by the television receiver, a program selection for one of the plurality of video scenes.

Various embodiments of the present method may include one or more of the following features. The method may include receiving, by the television receiver, media content for each of the plurality of video scenes at one or more tuners of the television receiver during output of the primary program on the display screen. The method may include, upon receiving the widget selection, tuning, by the television receiver, to the one or more tuners to receive the media content for each of the plurality of video scenes. The method may include decoding, by the television receiver, the media content during output of the primary program on the display screen. The primary program may include a broadcast television program being received by the television receiver. The primary program may include a recorded content that is stored in a memory drive of the television receiver. The method may include receiving, by the television receiver, at least one of the widget selection and the program selection from a remote controller in operative communication with the television receiver. In another aspect, the method may include receiving, by the television receiver, the command to activate the video EPG from a remote controller upon activation of a dedicated button for the video EPG on the remote controller.

In other aspects, the method may include receiving, by the television receiver, the command to activate the video EPG from a remote controller upon activation of two or more buttons simultaneously on a remote controller. The category of broadcast programs for at least one of the plurality widgets may be user-defined. The category of broadcast programs for at least one of the plurality of widgets may include broadcast programs that are automatically categorized under the widget by the television receiver based on a history of broadcast programs displayed on the display screen. In other aspects, the category of broadcast programs for at least one of the plurality of widgets may include a sports-specific category. The method may include, upon receiving the program selection, outputting, by the television receiver, for display on the display screen the selected broadcast program as the primary program.

Further aspects may be included in the method. Each of the plurality of widgets may be output as a transparent overlay over the primary programming being displayed on the display screen. The video menu may include an elongate, transparent background presented along a lower portion of the display screen and/or the plurality of video scenes in the video menu may be transparent and positioned in a single row within the elongate, transparent background. The plurality of video scenes in the elongate, transparent background may be scrollable in a horizontal direction. The program selection may include receiving, by the television receiver, a command to highlight one of the plurality of video scenes, whereby upon receiving the command, the television receiver may alter a presentation of the highlighted video scene from transparent to opaque. The method may include receiving, by the television receiver, a command to un-highlight the highlighted video scene, whereby upon receiving the command, the television receiver may alter the presentation of the highlighted video scene from opaque to transparent.

In another aspect, a non-transitory processor-readable medium having stored thereon a series of instructions which, when executed by a processor, cause the processor to provide a video EPG is provided. The series of instructions may include outputting a primary program for display on a display screen, receiving a command to activate the video electronic programming guide, and/or in response to receiving the command, outputting a plurality of widgets for display on a display screen, whereby each of the plurality of widgets may represent a category of broadcast programs. The series of instructions may include receiving a widget selection for one of the plurality of widgets on the display screen and/or in response to receiving the selection, outputting a video menu corresponding to the selected widget for display on the display screen, whereby the video menu may include a plurality of video scenes. Each of the plurality of video scenes may represent a broadcast program categorized in the selected widget. Further, the series of instructions may include receiving a program selection for one of the plurality of video scenes.

In yet another aspect, a system for providing a video EPG includes one or more processors and a memory communicatively coupled with and readable by the one or more processors, whereby the memory may have stored therein processor-readable instructions that are executable by the one or more processors. When executed, the processor-readable instructions may cause the one or more processor to output, by the system, a primary program for display on a display screen, receive, by the system, a command to activate the video electronic programming guide, and/or in response to receiving the command, output, by the system, a plurality of widgets for display on a display screen, whereby each of the plurality of widgets may represent a category of broadcast programs. The processor-readable instructions may cause the one or more processors to receive, by the system, a widget selection for one of the plurality of widgets on the display screen. Further, the processor-readable instructions may cause the one or more processors to, in response to receiving the selection, output, by the system, a video menu corresponding to the selected widget for display on the display screen, whereby the video menu includes a plurality of video scenes. Each of the plurality of video scenes may represent a broadcast program categorized in the selected widget. The processor-readable instructions may cause the one or more processors to receive, by the system, a program selection for one of the plurality of video scenes. It is noted that other embodiments and features are possible.

BRIEF DESCRIPTION OF THE DRAWINGS

The present invention is described in conjunction with the appended figures.

Figure 1:
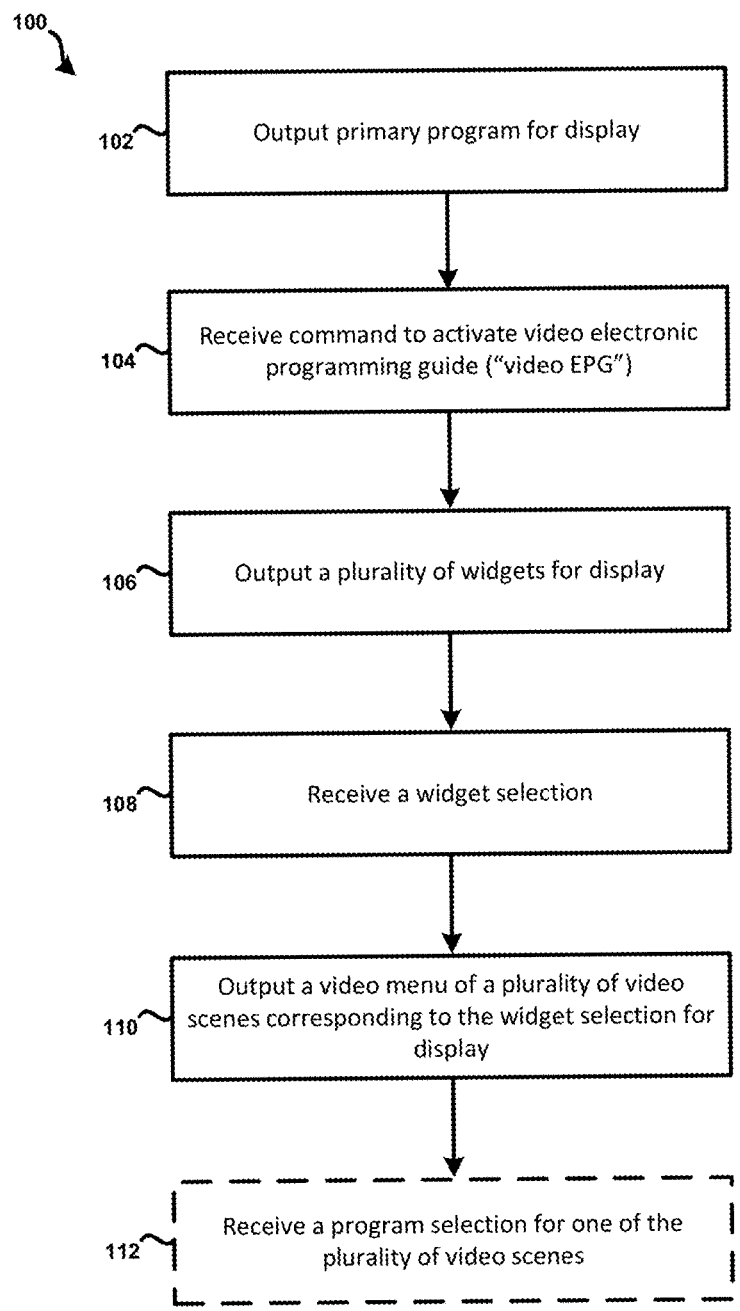
FIG. 1 shows an example method according to various embodiments of the present disclosure.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION OF THE INVENTION

In general, the systems and methods disclosed herein provide for a video electronic programming guide ("EPG") that displays a plurality of live video scenes of various live television programs, such as satellite broadcast programs. The video EPG may categorize and/or otherwise group together certain television programs and their corresponding live video scenes under a common genre and/or subject matter, which may be user-defined categories and/or preprogrammed categories. The video EPG may present the categories as widgets that are selectable and/or otherwise interactive with the users. For instance, upon receiving user selection of a widget, the video EPG may provide a video menu as a window containing one or more live video scenes that are categorized under or otherwise related to that widget. In an example, the video menu occupies a minimal portion of the primary screen as an overlay, such as a bottom, top, left or right side of the primary screen. In this way, a primary program being output on the display screen may still be viewable while live snapshots and/or updates of other programs, e.g. secondary programs, are also displayed per the video menu of the video EPG. The video EPG may permit volume sources between the primary program and the plurality of secondary programs to be toggled per user input.

Further, the video menu may be selectable and/or interactive with the user to change channels. For example, the video EPG may receive a user selection for a particular video scene in the video menu and jump to its corresponding channel for display as the primary program. Other interactions and features are possible. The display screen discussed herein may be provided on a display device such as a television and the video EPG may be provided for by a television receiver in communication with the television. In some cases, the video EPG may be provided by the display device itself. Other examples, features, and variations are possible.

In practice, the systems and methods described herein for the video EPG may provide various benefits for the users. For example, a television viewer may experience a more user-friendly and/or intuitive EPG that is sorted per genre and/or according to the user's preferences. The television viewer may view multiple channels and/or multiple broadcast programs simultaneously on the same display device. Further, in viewing the multiple channels, a primary program taking up a majority of the display screen may be maintained, while multiple secondary programs in the form of live video scenes are streamed and displayed to allow viewers to keep up with and/or catch glimpses of happenings in multiple other programs, without missing the primary program. In other aspects, users may save time with the video EPG, as the programs are sorted and/or categorized together as discussed previously. The video EPG allows users to quickly consume information from multiple channels and therefore make quicker decisions. For example, via the video menu, a user may immediately realize when a commercial break is airing and on which channel so that the user can choose to watch and/or delay watching of that channel. In other aspects, the video EPG allows the user to quickly switch between various channels, such as switch the primary program out with one or more of the secondary programs which are then displayed as the primary program on the display device, and in many variations therebetween. Further benefits may be realized.

Turning now to FIG. 1, an example method 100 for providing a video EPG is shown. The method 100 may be implemented by a television receiver, and/or any other device that may facilitate receiving media content and cause the media content to be displayed via a display screen, such as a television screen. The method 100 may include additional and/or alternative steps in relation to the steps being shown. Any of the steps may be optional, rearranged, and/or combined. Numerous variations are possible.

As shown in FIG. 1, the method 100 may include outputting media content for a primary program for display via a display device (step 102). For example, the television receiver may output a primary program for display on a display screen thereof. The primary program may occupy a majority or substantially entire portion of the display screen for a majority of the viewing session. In some examples, the primary program includes a broadcast television program being received by the television receiver, whereby the television receiver is tuned to receive and output the program. In other examples, the primary program includes recorded content, which may be stored in a memory drive of the television receiver. Other examples are possible.

As further shown in FIG. 1, the method 100 may include receiving a command to activate the video EPG (step 104). For example, the television receiver may receive the activation command from a remote controller of the television receiver, whereby upon activation of a dedicated button for the video EPG on the remote controller, the activation command is wirelessly transmitted to and received at the television receiver. The dedicated button may include a media guide or EPG button on the remote controller, and/or any other button that may be preprogrammed and/or user-specified for activating the video EPG. In another example, a predetermined combination of buttons on the remote controller sends the activation command to the television receiver. For instance, the television receiver may detect two or more buttons that are pressed simultaneously, in sequence and/or in other patterns, at the remote controller to display the video EPG. Other combinations of keys may be possible. It is further noted that such activation commands may be generated by buttons or soft buttons on the television receiver itself. In another aspect, the command may be generated based on user selection via a user interface displayed on the display device, such as a menu option displayed on the television screen in which the user may navigate using up/down buttons to select the video EPG. The television receiver may be in communication with a wireless device, such as a smart phone, tablet, and/or laptop mobile device, and receive selection of the video EPG from such platforms and/or mobile applications or website provided thereon. Further examples are possible.

It is further noted that step 104 may be optional and/or modified, as may any other step described herein. For instance, the television receiver may automatically initiate the video EPG, and/or portions thereof, without receiving commands from an external device and/or any command from any device. In another aspect, the video EPG may be activated automatically based on a time of day, viewing or user history, triggers or flagged events, a preset alarm, and/or an activation timer. It is noted that the television receiver may be in further communication with remote devices, such as via satellite, internet, and/or mobile wireless network connections. Other examples are possible.

In yet another example, upon receiving the activation command at step 104, the television receiver may request a username and/or password, question and answer sequence, facial recognition, and/or other type of login or identity verification. Such login requirements may prohibit inappropriate usages per user settings and/or allow a profile for the video EPG to be retrieved and presented. Merely by way of example, a user profile may contain customized layouts and/or widgets, with customized functionalities and experiences. Further, user profiles may be restricted and/or parental control settings may be applied, such as via a protected master user profile, to control usage of the video EPG. For instance, the user profile may permit the video EPG to be accessed by a child user profile during specified hours of the day and deny entry during other times of day, restrict and/or allow certain widgets or video content to be included in the video EPG, and so on. Other examples may be contemplated.

Further shown in FIG. 1, the method 100 may include outputting a plurality of widgets for display via the display device (step 106). For example, in response to receiving the activation command, the television receiver may output a plurality of widgets for display on the display screen. In some cases, each widget is output as a transparent overlay on top of the primary programming. Each of the plurality of widgets may be displayed as a unique representative icon with or without text to indicate a category of broadcast programs. Such categories may be user-defined and/or preprogrammed, and/or a combination thereof. In an example, the category of broadcast programs for at least one of the plurality of widgets includes broadcast programs that are automatically categorized under that widget by the television receiver. For instance, automatic categorizations provided by the television receiver may be based on a history of broadcast programs displayed on the display screen, user profile preferences and/or age groups, time of day, or other factors. In another example, the category of broadcast programs for at least one of the plurality of widgets includes a sports-specific category. Other widget categories may include weather, news, cartoons, children's shows, music videos, talk shows, movies, new movies, and so on. In another aspect, the plurality of widgets provided at step 106 are based on the user profile login and may vary from user to user. Further, for example, a sports widget under a first user profile may be different from, e.g. have different categorized contents and/or representative icon, and independent of a sports widget associated with another user profile.

Widgets may be configurable by user input, preprogrammed, and/or based on predominant content that was viewed by the user, such as a viewing history and/or content viewed coinciding with certain times of day. In another aspect, a widget may include matter that is detected by the television receiver as trending on various social media websites and/or applications. For instance, the composition of content categorized under a certain widget may be based on a source that is defined and/or otherwise linked to the widget by user input. Further, it is noted that widgets may be dynamically updatable, such as adding and/or removing certain contents categorized thereunder based on changes that are detected in the source.

Still further shown in FIG. 1, the method 100 may include receiving a widget selection (step 108). For example, the television receiver may receive a widget selection for one of the plurality of widgets presented on the display screen. In some examples, the television receiver receives the widget selection, and/or a subsequent broadcast program selection contained in a widget, from a remote controller in operative communication with the television receiver. Other examples are possible. In other aspects, the television receiver may, upon receiving the widget selection, tune one or more tuners to receive the media content of the various channels categorized in the selected widget. In this way, the television receiver may receive, decode, decrypt, and/or otherwise obtain each of the plurality of video scenes associated with each of the plurality of broadcast programs contained in the widget. It is contemplated that the television receiver may prepare the plurality of video scenes in this manner for output while the primary programming is being output on the display device.

In another aspect, the television receiver may tune to various channels prior to any widget being selected, such as at the onset of receiving, at the television receiver, the command to activate the video EPG at step 104. In some cases, a number of video scenes or channels that may be provided may depend on a number of tuners that are detected, by the television receiver, to be free and available to capture the video scenes. In other cases, the television receiver may automatically and/or predictively tune to a widget's categorized channels to retrieve the video scenes prior to the user selecting the widget. For instance, the prediction may be based on user history and/or time of day to anticipate a user widget selection. Settings for such tuning variations may be defined in a user setup, such as a one-time initial user set-up of the user profile and/or of each widget.

In an example, the television provides a plurality of tuners, such as 16 tuners. During a viewing time, some of the tuners may be utilized for recording certain programs and/or receiving the main primary program. The remaining tuners may be determined as free and available for use by the video EPG. In another aspect, even recorded programs that are currently being recorded may be displayed in the live video scene if desired, e.g. if its widget is selected by the user. In another example, a widget may be categorized as "current recordings," in which currently recorded showings, e.g. DVR, are categorized. Merely by way of example, a user selection for the current recordings widget may permit the use to view video scenes of various broadcast programs being recorded at the moment, and stop and/or pause the recording on the spot.

In a further example, some widgets may not provide content-specific broadcast programs, but are configured to be generally scrollable. For instance, a general widget may appear whereby a user may scroll through all channels available via the television receiver, scroll through recent channels, scroll through favorite channels, and so on. By way of example, the contents of the widget may be based on the primary program channel, whereby the widget includes the next four channels from the current channel, two channels before and after the current channel, and so on. In some aspects, the widget may be dynamically updated to contain such channels based on the primary program being displayed and/or the television receiver may be configured to dynamically tune to such channels.

Further shown in FIG. 1, the method 100 may include outputting, for display via the display device, a video menu of a plurality of video scenes that correspond to the widget selection (step 110). For example, in response to receiving the selection, the television receiver may output a video menu corresponding to the selected widget for display on the display screen, whereby the video menu includes a plurality of video scenes, further whereby each of the plurality of video scenes represents a broadcast program that is categorized in the selected widget. The video menu may appear in various forms, which may be preprogrammed and/or user-customizable. In some cases, a user interface of the video menu is specific to a user profile. Merely by example, the video menu may comprise a ribbon located along a bottom of the television display screen and the plurality of video scenes may be contained in a row within the ribbon. The ribbon may be presented as an elongate, transparent background along the lower portion of the display screen and the plurality of video scenes in the video menu may be presented as transparent and positioned in a single row, and/or multiple rows, within the elongate, transparent background. The plurality of video scenes in the elongate, transparent background may be scrollable in a horizontal direction as a rolling bar. Other examples, geometric shapes, and vertical scrolling directions are possible. It is contemplated that the main, primary program continues to be displayed on the television screen while the video menu is active and/or interactive with the user.

In another aspect, the method 100 includes receiving, by the television receiver, media content for each of the plurality of video scenes at one or more tuners of the television receiver during output of the primary program on the display screen. The television receiver may decode, decrypt, and/or otherwise prepare the secondary media content for display during the output of the primary program on the display screen. It is contemplated that the video scenes in the video menu are not static videos, but dynamically received programs having video, sound, closed-captioning and/or other streams that are received in real-time but merely presented in a smaller portion of the screen. In a further example, elementary streams such as closed-captioning and/or sounds associated with the video scenes, e.g. secondary programs, may be received but omitted from being output, decrypted and/or decoded. In that way, resources may be conserved. It is noted that such streams may be provided and/or activated, for example, if the user inputs a selection to view and/or activate a sound for the contents of a certain video scene even with the original primary programming being displayed as a main display.

In further examples, displaying the video menu at step 110 may be automatically provided by the television receiver without being prompted by a user's widget selection. For example, a video menu may be configured to appear based upon a category type of the primary programming being displayed. Merely by example, if the primary program is a football game, the video EPG may seek other football games being broadcast at the same broadcast time and automatically populate the video menu with video scenes of the other football games. The video menu may be dynamically repopulated as the user switches channels and/or media types.

It is further noted that the plurality of video scenes in a widget may be user customized. For example, a favorites widget may be configured to allow the user to contribute favorite channels. In another aspect, the favorites widget may be dynamic and automatically customized for the user. For instance, the television receiver may keep a view history of the user for a period of time and compile favorites based on the view history. The television receiver may further update the favorites widget in predetermined intervals to accommodate a viewer's "latest" favorites, such as by eliminating previously added channels and/or adding new channels. In another aspect, a recommended widget may provide a plurality of broadcast programs that are recommended to the user based on the user's view history, age group, and/or other factors. It is noted that any of the widgets described herein may include a hybrid of different features, such as a combination of automatically updated channels and/or user-entered channels being categorized under the same widget. It is further noted that a same broadcast programming and/or channel may be categorized until multiple different widgets.

The television receiver may allow the user to view the plurality of channels in the widget by sliding a bar and/or selecting a scroll button to scroll the video scenes from a left to right, right to left, up to down, and/or down to up motion. Such inputs may be communicated to the television receiver via a remote controller. In another aspect, video scenes displayed in the video menu may be reordered by a user's input for clicking and dragging the particular video scene to a particular location. In another aspect, each widget and/or video scene may be removable by a user after it is displayed on the display screen, and/or through various settings menus and options. It is noted that the widgets may be reordered and/or manipulated in a similar fashion. In other aspects, video scenes may be paused, increased or decreased in volume, and/or muted from the video menu display. Further, it is contemplated that the various components of the video EPG described herein are stored locally on the television receiver and can be updated via satellite and/or internet communication with a provider, such as a satellite television provider. Such updates may require manual download and/or are automatically pushed to the television receiver.

Still further shown in FIG. 1, the method 100 may include receiving a program selection for one of the plurality of video scenes (step 112). It is noted that this step, as any other step described herein, may be optional. For example, the video menu may be maintained for display on the display screen for a period of time without receiving any program selection. Merely by way of example, in that case, the viewer may wish to monitor other programs without jumping to any channels. In another example, the television receiver may receive a program selection for one of the plurality of video scenes, such as via a remote controller. Upon receiving the program selection, the television receiver may output for display on the display screen the selected broadcast program as the primary program. For instance, the user may click on the video scene to designate the program selection, whereupon the program selected becomes the primary channel. In an aspect, the current primary program and the secondary program being selected may swap positions on the display screen. For instance, the primary program may be dropped into the video menu by shrinking to a smaller size and replacing the secondary program's slot in the video menu, while the secondary program may be expanded for display on the primary display screen.

In another example, the program selection includes receiving, by the television receiver, a command to highlight one of the plurality of video scenes in the video menu. Upon receiving the highlight command, for instance where a display cursor is placed over a particular video scene for an extended period of time and/or a scroll motion is stopped on a particular video scene, the television receiver may alter a presentation of the highlighted video scene. In some cases, the highlighted scene is transformed from a transparent presentation to an opaque presentation. In other cases, the highlighted scene is transformed from an opaque presentation to a transparent presentation in the video menu. In another example, the television receiver may receive a command to un-highlight the highlighted video scene, whereby upon receiving the command, the television receiver may alter the presentation of the highlighted video scene from an opaque to transparent presentation. In still other examples, highlighting the video scene may cause the video scene to be expanded to the primary screen, expanded slightly larger than the non-highlighted video scenes, increased in volume setting of the particular video scene to override the primary program's audio, and/or additional textual information related to the broadcast programming of the video scene may pop up on the display.

Other examples may be contemplated. For instance, the video menu may disappear from the display screen after a period of time upon no user selection and/or activity. In that case, the tuners may stop receiving the secondary programs. In other cases, the tuners cease receiving the secondary programs after a delay period. The video menu may drop down or otherwise reappear on the display screen in response to a user input, e.g. depression of a button on the remote controller. Still, in other examples, the video menu may be configured to stay on the screen automatically and/or upon user input to add the video menu as a toolbar to the display screen. In this way, the viewer may continue to watch multiple shows at once. For instance, five football games may be aired in a same timeslot. A viewer may watch one football game as a primary program and the remaining four as secondary programs in the video menu, which may appear on the screen for the duration of the broadcast(s) and/or upon user input. In another aspect, a widget having a football category may include the five football games. It is noted that the viewer may select the widget, whereby four secondary programs are provided in the video menu and a fifth remaining program is designated as the primary program. In another example, all five video scenes may appear in the video menu if the primary program is unrelated or not included in that widget. In this way, the video menu may be dynamic.

In further aspects, various functions may be available for the secondary programs in the video menu. For instance, the user may select a video scene to initiate recording of the broadcast programming onto local memory for later viewing. A quick key and/or soft button may appear to allow the user to initiate recording of the live video scene.

In other aspects, triggers and/or notifications may be provided on the display device and/or other devices in communication with the television receiver. For example, the television receiver may detect when a touchdown in a football game occurs. In response to the touchdown trigger, the television receiver may display a pop-up sports icon indicating a touchdown, whereby the icon may appear over the particular video scene in the video menu. In other examples, the television receiver may flash and/or highlight the video scene with colors or outlines to indicate to the user when a critical event occurs. Such critical events may be user-defined and cause the television receiver to detect for triggers of the critical events in various programs received at the television receiver. By example, the television receiver may scan the any media content, such as closed captioning and/or images of the contents, to determine when events are triggered and when the notifications should appear. The television receiver may be configured to transmit electronic notification or messages, such as emails and/or text messages, to mobile devices or any other device that may be connected thereto. Upon receiving indication or notification of the critical event, the user can immediately jump to the proper channel via the video menu to view the events that happened. It is noted that media content in the primary program, secondary program(s), and/or other programs not currently being output for display may be monitored for triggers. Still, other examples are possible.

Figure 2:
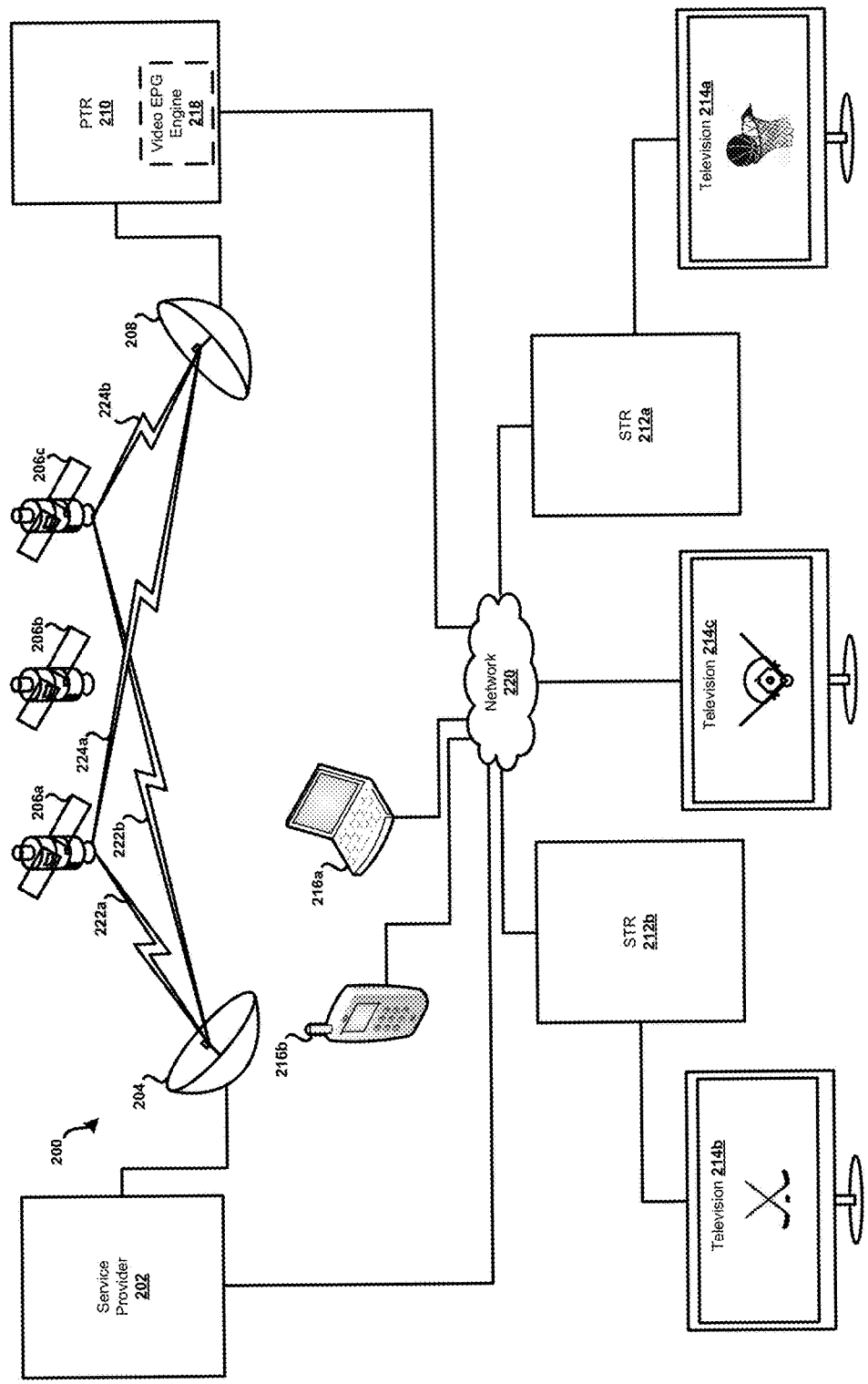
FIG. 2 shows an example satellite system according to various embodiments of the present disclosure.

Turning now to FIG. 2, an example satellite system 200 is shown in accordance with the present disclosure. For brevity, the satellite system 200 is depicted in a simplified form, and may generally include more or fewer systems, devices, networks, and/or other components as desired. Further, number and type of features or elements incorporated within the satellite system 200 may or may not be implementation-specific, and at least some of the aspects of the satellite system 200 may be similar to a cable television distribution system, an IPTV (Internet Protocol Television) content distribution system, and/or any other type of content distribution system.

In this example, the satellite system 200 may include a service provider 202, a satellite uplink 204, a plurality of orbiting (e.g., geosynchronous) satellites 206a-c, a satellite dish 208, a PTR (Primary Television Receiver) 210, a plurality of STRs (Secondary Television Receivers) 212a-b, a plurality of televisions 214a-c, and a plurality of computing devices 216a-b. The PTR 210 may include a video EPG engine 218 that is programmatically configured to provide the video EPG described herein, such as any of the steps discussed above regarding method 100. As discussed throughout, the video EPG engine 218 may be provided according to a particular hardware and/or firmware architecture of the PTR 210. In other examples, the video EPG engine 218 may alternatively and/or additionally be provided in the STRs 212a-b. Such implementations may be beneficial and/or advantageous in many respects, as described further in the succeeding paragraphs.

The satellite system 200 may also include at least one network 220 that establishes a bidirectional communication path for data transfer between and among each respective element of the satellite system 200 outside of the unidirectional satellite signaling path. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the satellite system 200.

The PTR 210, and the STRs 212a-b, as described throughout may generally be any type of television receiver, television converter, such as a STB (Set-Top-Box) for example, Blue-Ray player, DVD player, IPTV box, etc. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 220, together with the STRs 212a-b and televisions 214a-c, and possibly the computing devices 216a-b, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example satellite system 200 may be configured to communicate in accordance with the MoCA® (Multimedia over Coax Alliance) home entertainment networking standard. Still other examples are possible.

In practice, the satellites 206a-c may each be configured to receive uplink signals 222a-b from the satellite uplink 204. In this example, the uplink signals 222a-b may contain one or more transponder streams of particular data or content, such as particular television channel, that is supplied by the service provider 202. For example, each of the respective uplink signals 222a-b may contain various media content such as a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc.

The satellites 206a-c may further be configured to relay the uplink signals 222a-b to the satellite dish 208 as downlink signals 224a-b. Similar to the uplink signals 222a-b, each of the downlink signals 224a-b may contain one or more transponder streams of particular data or content, such as various encoded and/or at least partially electronically scrambled television channels, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation-specific scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 224*a-b*, from one or more of the satellites 206*a-c*. Based on the characteristics of the PTR 210 and/or satellite dish 208, however, it may only be possible to capture transponder streams from a limited number of transponders concurrently. For example, a tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214*c* for display thereon. For example, the satellite dish 208 and the PTR 210 may, respectively, be configured to receive, decode, and relay at least one premium HD-formatted television channel to the television 214*c*. Programming or content associated with the HD channel may generally be presented live, or from a recording as previously stored on, by, or at the PTR 210. In this example, the HD channel may be output to the television 214*c* in accordance with the HDMI/HDCP content protection technologies. Other examples are possible.

Further, the PTR 210 may select via tuner, decode, and relay particular transponder streams to one or both of the STRs 212*a-b*, which may in turn relay particular transponder streams to a corresponding one of the television 214*a* and the television 214*b* for display thereon. For example, the satellite dish 208 and the PTR 210 may, respectively, be configured to receive, decode, and relay at least one television channel to the television 214*a* by way of the STR 212*a*. Similar to the above example, the television channel may generally be presented live, or from a recording as previously stored on the PTR 210, and may be output to the television 214*a* by way of STR 212*a* in accordance with a particular content protection technology and/or networking standard. Still further, the satellite dish 208 and the PTR 210 may, respectively, be configured to receive, decode, and relay at least one premium television channel to one or both of the computing devices 216*a-b*. Similar to the above-examples, the television channel may generally be presented live, or from a recording as previously stored on the PTR 210, and may be output to one or both of the computing devices 216*a-b* in accordance with a particular content protection technology and/or networking standard.

Figure 3:
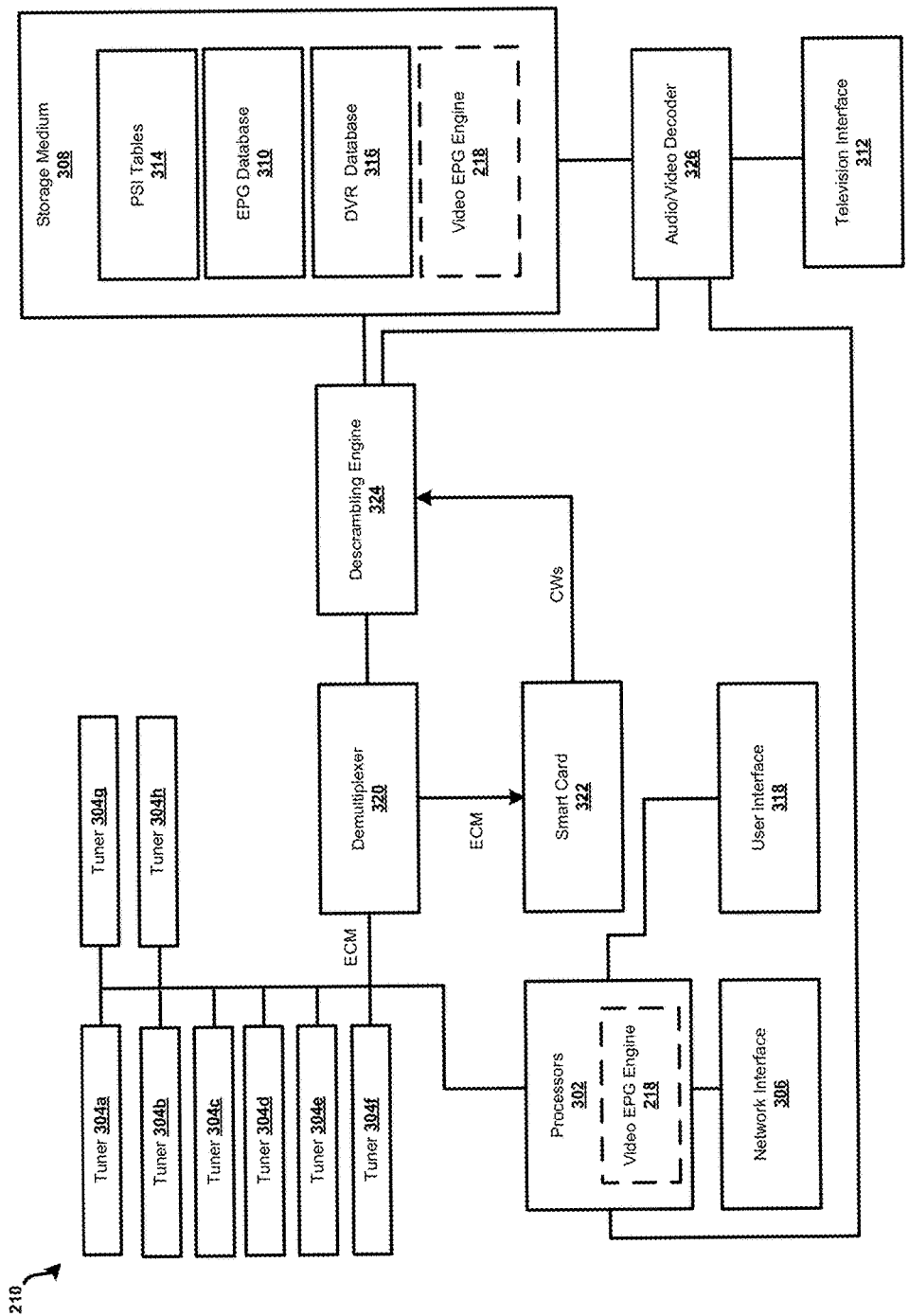
FIG. 3 shows an example block diagram for a television receiver according to various embodiments of the present disclosure.

Referring now to FIG. 3, an example block diagram of the PTR 210 of FIG. 2 is shown in accordance with the present disclosure. In some examples, at least one of the STRs 212*a-b* may be configured in a manner similar to that of the PTR 210. In other examples, at least one of the STRs 212*a-b* may be configured to exhibit a reduced functionality as compared to the PTR 210, and may depend at least to a certain degree on the PTR 210 to implement certain features or functionality. In this example, the STRs 212*a-b* may be referred to as a "thin client."

For brevity, the PTR 210 is depicted in a simplified form, and may generally include more or fewer elements or components as desired in accordance with the present disclosure. For example, the PTR 210 is shown in FIG. 3 to include the video EPG engine 218. In general, and as discussed in further detail below, the video EPG engine 218 may be configured to provide user-selectable widgets and display live video scenes of a plurality of broadcast programs concurrently for a selected widget. Other examples are possible as well.

Additionally, although not explicitly shown in FIG. 3, the PTR 210 may include one or more logical modules configured to implement a television streaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the PTR 210 may be configured to include any number of other various components or logical modules that are implemented in hardware, software, firmware, or any combination thereof, and such components or logical modules may or may not be implementation-specific.

Referring still to FIG. 3, the PTR 210 in this example includes one or more processors 302, a plurality of tuners 304*a-h*, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304*a-h* may be used to tune to television channels, such as television channels transmitted via satellites (not shown). Each one of the tuners 304*a-h* may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. If multiple television channels transmitted on the same transponder stream are desired, a particular tuner (e.g., tuner 304*c*) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites, which may be unidirectional to the PTR 210, and another communication channel between the service provider 202 and the PTR 210, which may be bidirectional, may be via a network, such as various wireless and/or hardwired packet-based communication networks, including, for example, a WAN (Wide Area Network), a HAN (Home Area Network), a LAN (Local Area Network), a WLAN (Wireless Local Area Network), the Internet, a cellular network, a home automation network, or any other type of communication network configured such that data may be transferred between and among respective elements of the satellite system 200. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the video EPG engine 218 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example, eight television channels may be decoded concurrently or simultaneously.

The television interface 312 outputs a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more viewers or users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features as discussed in the context of the present disclosure. For example, the PTR 210 is shown in FIG. 3 to include the video EPG engine 218 as mentioned above in connection with FIG. 2. Further, some routing between the various modules of the PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Figure 4:
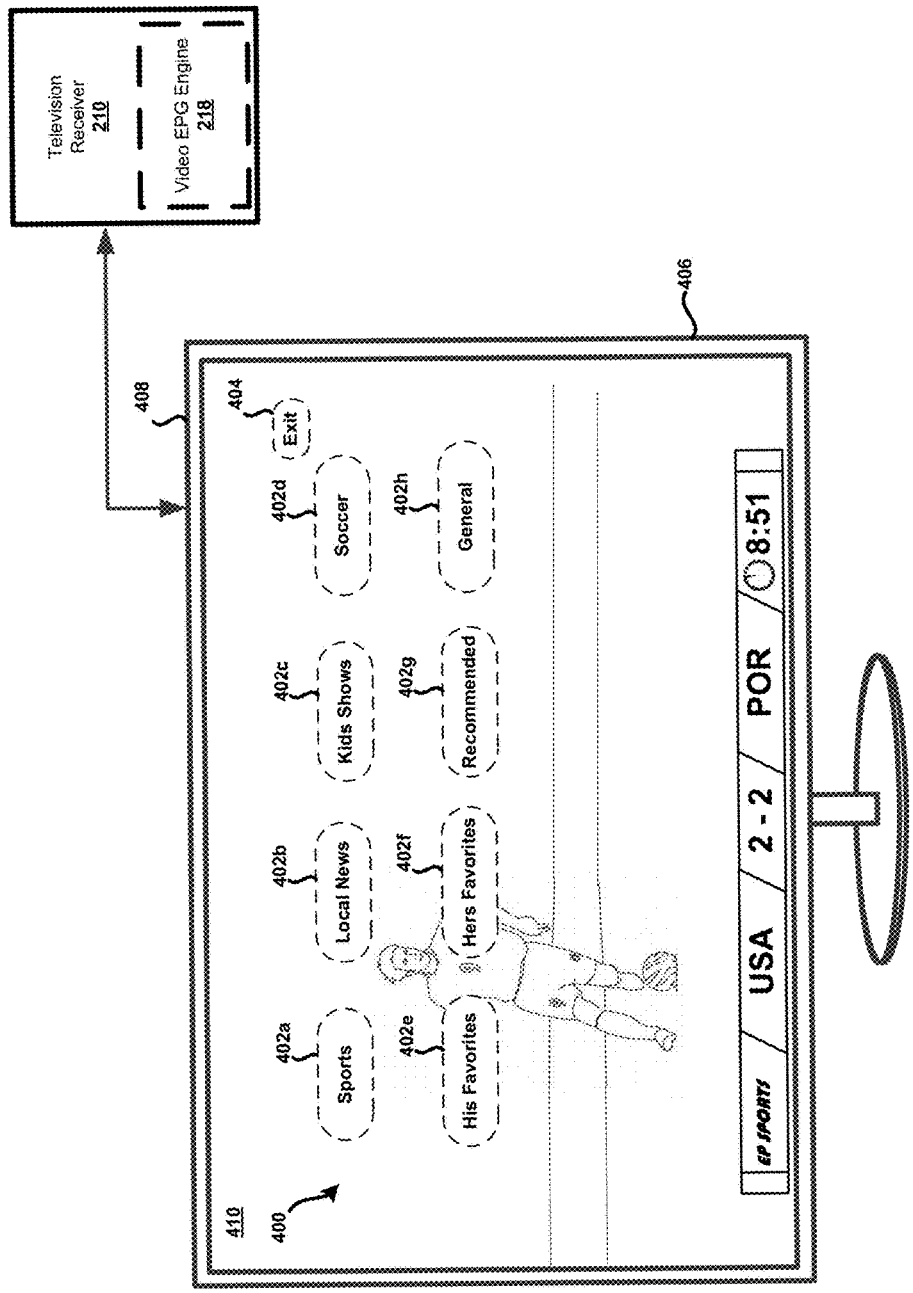
FIG. 4 shows example widgets of a video EPG according to various embodiments of the present disclosure.

Turning now to FIG. 4, an example user interface 400 for a video EPG is shown. The user interface 400 includes a plurality of widgets 402a-h of the video EPG and an exit button 404 to leave the video EPG view and remove the widgets 402a-h from being output for display. It is contemplated that the various components of the user interface 400 may be provided on a display screen 406 of a display device 408, which may be operatively connected to the television receiver 210 and/or to the video EPG engine 218 thereof. An example media content for a soccer game is output for presentation on the display device 408 as a primary program 410. It is noted that the widgets 402a-h may span multiple, scrollable, digital pages, and/or be shown completely in a single overlay. Furthermore, the widgets 402a-h may be presented as transparent, semi-transparent, and/or opaque icons with and/or without customizable text. It is contemplated that each icon may include subject-specific graphics and/or text that indicate a category represented by each widget 402a-h. In another aspect, the icons for the widgets 402a-h may be customized by the user. Further, it is contemplated that the user interface 400 may disappear from the display screen 406 if no user interaction or input is detected by the television receiver 210 after a predetermined length of time.

It is noted that the widgets 402a-h are illustrated for example only, and that the user interface 400 may provide any number of widgets 402a-h for display. A sports widget 402a may be configured to contain one or more sports channels and/or sporting events. A local news widget 402b may provide a plurality of news channels. A kids show widget 402c may display video scenes from various children's programming. A soccer widget 402d may show only soccer matches being broadcast, and/or other sports-specific content. A his favorites widget 402e and a hers favorites widget 402f may be provided for customization by different users of the commonly-shared user interface 400 of the video EPG. In another example, the user interface 400 is specific to a user profile and/or login. In another example, one or more of the widgets 402a-h may require login to access the video scenes provided therein. A recommended widget 402g may include various broadcast programming that are recommended to the one or more users of the video EPG, and may be based on a view history and/or time of day. A general widget 402h may be provided to allow the user to scroll through a plurality of broadcast programming, for instance, through recently-viewed programming and/or for channel surfing. Other examples are possible.

Further, it is noted that any broadcast programming may be categorized into the widgets according to a channel number, a genre type, user selection, and/or a combination thereof. For example, a channel may be dynamically added to and/or removed from a widget based on a genre type of a broadcast programming provided at that time. In another example, a channel may be added to and/or removed from the widget based on the channel number itself. It is contemplated that the user may scroll through the user interface 400 via input buttons on the remote controller, such as left, right, up, and/or down arrow buttons on the remote controller.

Figure 5:
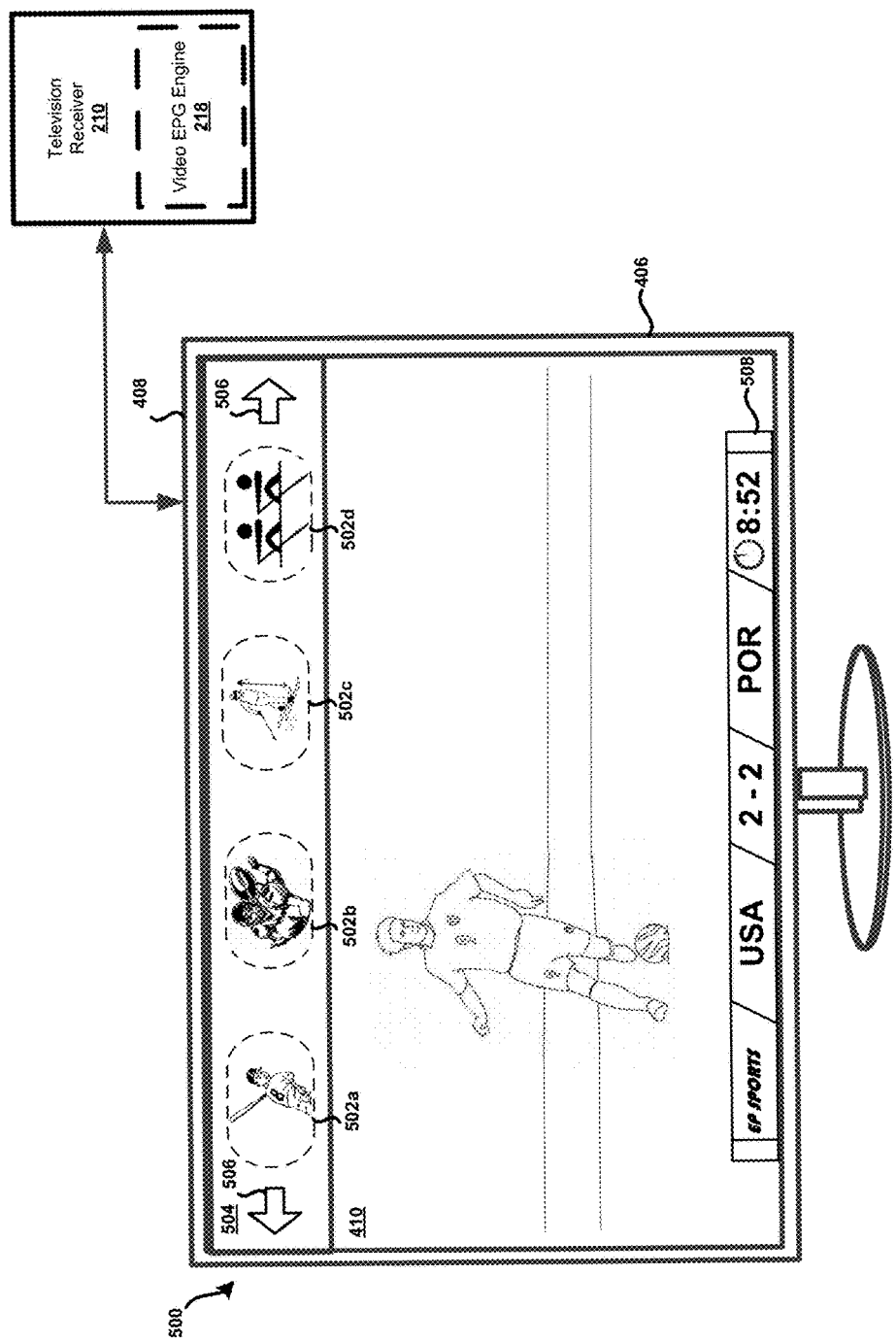
FIG. 5 shows example video scenes of a video EPG according to various embodiments of the present disclosure.

Turning to FIG. 5, another example user interface 500 of the video EPG is shown. The user interface 500 includes a plurality of example video scenes 502a-d that are provided in a video menu 504 of the video EPG. The video menu 504 may include one or more scroll indicators 506, which may receive user input for scrolling or otherwise browsing through additional video scenes that are categorized under the selected widget. The video menu 504 may be output upon user selection of one of the plurality of widgets 402a-h. By way of example, the video menu 504 shown corresponds to the sports widget 402a, whereby the video scenes 502a-d show live media content of any broadcast programming that is determined to be a sporting event, such as a baseball program 502a, a football program 502b, a ski program 502c, a rowing program 502d, and so on. It is noted that any of the video scenes 502a-d may be removed from the video menu 504 upon user input, and additional video scenes may be added, for example, by user input of a particular channel number into the video menu 504, which may then include video scenes from the particular channel number. In another aspect, a standard textual EPG grid is still available to the user in addition to the video EPG shown here, and/or to supplement the video EPG by permitting the user to select additional channels and/or broadcast programming therefrom. For instance, a textual EPG may pop-up upon user command, whereby the user may browse and select a broadcast programming to be added as a video scene in the video menu 504. Other examples are possible.

A location, placement, and/or geometric shape of the video menu 504 may be selected by a user to avoid obstruction with various portions of the primary programming 410, such as a score bar 508. In another aspect, a best placement and/or geometric shape for the video menu 504 may be detected by the television receiver 210 based on analysis of the primary program 410. In an example, the example video menu 504 includes an elongate, horizontal bar that may permit horizontal scrolling. The video menu 504 may be altered to an elongate, vertical bar spanning either side of the display screen 406. Further, the video menu 504 may be lengthened and/or widened per user customization. As described previously, the video menu 504 and/or plurality of example video scenes 502a-d may be transparent, semi-transparent, opaque, and/or toggled therebetween. Other examples are possible.

Figure 6:
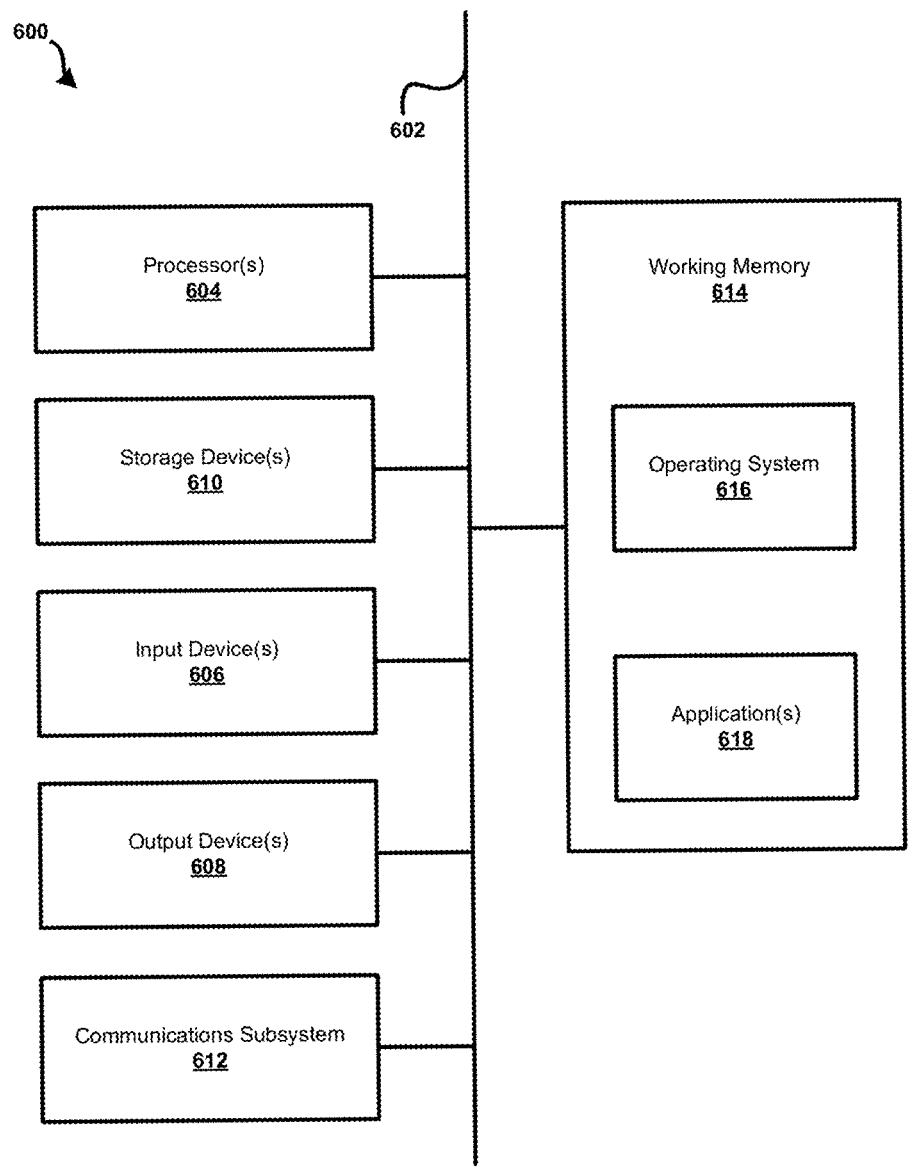
FIG. 6 shows an example block diagram for a computing system upon which various features various embodiments of the present disclosure may be provided.

Turning now to FIG. 6, an example block diagram for a computer system or device 600 upon which various features of the present disclosure may be provided is shown. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 600, such as any of the respective elements of at least FIG. 2 and FIG. 3. In this manner, any of one or more of the respective elements of at least FIG. 2 and FIG. 3 may be configured to perform and/or include instructions that, when executed, perform the methods and features of FIG. 1, FIG. 4, and/or FIG. 5. Still further, any of one or more of the respective elements of at least FIG. 2 may be configured to perform and/or include instructions that, when executed, instantiate and implement functionality of the PTR 210 and/or the server(s).

The computer device 600 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which may include without limitation a remote control, a mouse, a keyboard, and/or the like; and one or more output devices 608, which may include without limitation a presentation device (e.g., television), a printer, and/or the like.

The computer system 600 may further include (and/or be in communication with) one or more non-transitory storage devices 610, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 600 might also include a communications subsystem 612, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 612 may permit data to be exchanged with a network (such as the network described below, to name one example), other computer systems, and/or any other devices described herein. In many embodiments, the computer system 600 will further comprise a working memory 614, which may include a random access memory and/or a read-only memory device, as described above.

The computer device 600 also may comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 600) to perform methods in accordance with various embodiments of the disclosure. According to a set of embodiments, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 610. Volatile media may include, without limitation, dynamic memory, such as the working memory 614.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

It should further be understood that the components of computer device 600 can be distributed across a network. For example, some processing may be performed in one location using a first processor while other processing may be performed by another processor remote from the first processor. Other components of computer system 600 may be similarly distributed. As such, computer device 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing an electronic programming guide (EPG), comprising:
   receiving, by a television receiver, user input from a user defining a source of social media, wherein:
      television programming currently trending is identified from the source of the social media;
   configuring, by the television receiver, a social media widget to use the source of social media based on the received user input;
   tuning, by the television receiver, one or more tuners to a plurality of broadcast television channels receiving the television programming to obtain a plurality of video scenes, wherein the tuning is performed based on the television receiver predicting selection of the social media widget by the user;
   outputting, by the television receiver, a plurality of widgets for display as part of the EPG, wherein:
      the plurality of widgets comprises the social media widget to the television programming currently trending on the source of social media used based on the received user input;
      the social media widget is associated with a single category of broadcast programming selected from a plurality of categories of broadcast programming; and
      the single category of broadcast programming is selected for the social media widget by the television receiver based on historical content output for presentation by the television receiver;
   receiving, by the television receiver, a selection of the social media widget of the plurality of widgets output for display;
   in response to the received selection of the social media widget, outputting, by the television receiver, a menu corresponding to the social media widget for display, wherein:
      the menu indicates a plurality of broadcast programs categorized in the single category of broadcast programming of the social media widget, each of the plurality of broadcast programs currently trending on the source of the social media; and
      each of the plurality of broadcast programs of the plurality of broadcast programs indicated by the menu is represented by a corresponding representative video scene of the plurality of video scenes obtained via the one or more tuners being tuned to the plurality of broadcast television channels based on the television receiver predicting selection of the social media widget by the user;
   receiving, by the television receiver, a program selection from the menu; and outputting, by the television receiver, a broadcast program corresponding to the received program selection.

2. The method for providing the EPG of claim 1, wherein a second widget of the plurality of widgets is mapped to a plurality of favorite channels.

3. The method for providing the EPG of claim 1, wherein:
video scenes from the plurality of video scenes are presented in a single row as part of an overlay interface such that only a subset of the plurality of video scenes are presented at a given time, wherein the overlay interface is presented over a primary piece of content being output for display; and
a scroll interface is presented that enables scrolling to change the subset of the plurality of video scenes that are presented.

4. The method for providing the EPG of claim 1, wherein the plurality of widgets are output as an overlay over primary programming being output by the television receiver.

5. The method for providing the EPG of claim 1, wherein a second widget of the plurality of widgets is mapped to a plurality of user-defined television channels.

6. The method for providing the EPG of claim 1, wherein the single category of broadcast programming is selected from the group consisting of: sports, weather, news, cartoons, children's shows, music videos, talk shows, and movies.

7. A television receiver for providing an electronic programming guide (EPG), comprising:
a plurality of tuners;
a television interface;
a user interface;
one or more processors; and
a memory communicatively coupled with and readable by the one or more processors and having stored therein processor-readable instructions which, when executed by the one or more processors, cause the one or more processors to:
receive, via the television interface, user input defining a source of social media, wherein television programming currently trending is identified from the source of the social media;
configure a social media widget to use the source of social media based on the received user input;
tune one or more tuners of the plurality of tuners to a plurality of broadcast television channels receiving the television programming to obtain a plurality of video scenes, wherein the tuning is performed based on the television receiver predicting selection of the social media widget by a user;
output, via the television interface, a plurality of widgets for display as part of the EPG, wherein:
the plurality of widgets comprises the social media widget to the television programming currently trending on the source of social media used based on the received user input;
the social media widget corresponds to a single category of broadcast programming selected from a plurality of categories of broadcast programming; and
the single category of broadcast programming is selected for the social media widget by the television receiver based on historical content output for presentation by the television receiver;
receive a selection of the social media widget of the plurality of widgets output for display via the television interface;
in response to the received selection of the social media widget, output, via the television interface, a menu corresponding to the selected social media widget for display, wherein:
the menu indicates a plurality of broadcast programs categorized in the single category of broadcast programming of the selected social media widget, each of the plurality of broadcast programs currently trending on the source of the social media; and
each of the plurality of broadcast programs of the plurality of broadcast programs indicated by the menu is represented by a corresponding representative video scene of the plurality of video scenes obtained via the plurality of tuners being tuned to the plurality of broadcast television channels based on the television receiver predicting selection of the social media widget by the user;
receive, via the user interface, a program selection from the menu; and
output, via the television interface, a broadcast program corresponding to the received program selection.

8. The television receiver for providing the EPG of claim 7, wherein:
video scenes from the plurality of video scenes are presented in a linear arrangement such that only a subset of the plurality of video scenes are presented at a given time; and
a scroll interface is presented that enables scrolling to change the subset of the plurality of video scenes that are presented.

9. The television receiver for providing the EPG of claim 7, wherein a second widget of the plurality of widgets is mapped to a plurality of user-defined television channels.

10. The television receiver for providing the EPG of claim 7, wherein the single category of broadcast programming is selected from the group consisting of: sports, weather, news, cartoons, children's shows, music videos, talk shows, and movies.

* * * * *